April 14, 1953  C. I. DUNN  2,634,920
FISHING REEL
Filed Aug. 10, 1948

INVENTOR.
CHARLES ISAAC DUNN
BY
Thiess, Olson & Mecklenburger
Attys

Patented Apr. 14, 1953

2,634,920

UNITED STATES PATENT OFFICE 2,634,920

FISHING REEL

Charles Isaac Dunn, Chicago, Ill.

Application August 10, 1948, Serial No. 43,477

4 Claims. (Cl. 242—84.5)

This invention relates to fishing reels and more particularly to casting reels adapted to cast lightweight line endwise from a stationary, non-rotating spool.

Heretofore in casting with lightweight line and lightweight bait in endwise removal of the line from the reel's spool (or more commonly called spinning) it has been necessary to mount the spool of the reel on an extended pedestal or leg. The pedestal was an expedient solution to the tendency the line has to whip in the wide loop characteristic of casting with reels of this type. The size or diameter of the loop is directly proportionate to the spool's diameter. The whipping of the line is due to the centrifugal force induced in it as it rotates in unwinding. The disadvantage of whipping lies in the tendency of the line to drag with friction on the rod and its annular guides and, in some instances, to snub itself short. The disadvantage of the pedestal lies in the awkwardness and unbalance of a reel so mounted. Along with the advantages of "spinning" reels as commonly known, a further disadvantage of reels of this type known heretofore is in the need for manually engaging and releasing the line from a wire hook or similar retrieving device before and after each cast, or in some reels by the need for manually removing a small portion of the line from the spool and restraining said portion manually while preparing to cast, and manual release of the line so held, at the instant of the cast.

Thus, it is one of the objects of this invention to provide a "spinning" reel which when mounted with its spool in close proximity to the rod will be well balanced thereon and not tend to twist the rod handle in the hand of the user while casting.

It is a further object of this invention to provide a "spinning" reel with guard means to confine and minimize the whipping action of the line as it loops from the spool in endwise removal therefrom when freed at the termination of the casting stroke.

It is a further object of this invention to provide a reel of this type with means eliminating the need for manually engaging and releasing the line from a retrieving device, and providing means for eliminating the need for manual restraint of a portion of the line by way of preventing accidental casting, and means eliminating the need for manual release of a portion of line so held, in the instant of the cast.

It is still a further object of this invention to provide a reel incorporating the known advantages of endwise removal of the line from the spool upon casting, which is provided with frictional means to prevent premature or accidental casting, through the gearing mechanism (commonly called "creeping" of the cast), in the manner of reels casting the line tangentially from the spool, rather than in the endwise casting manner normal to reels of this type.

It is still a further object of this invention to provide a reel of the "spinning" type which is simple yet sturdy in construction, effective in operation, and inexpensive to produce.

Further and additional objects will appear from the description, the appended claims and the accompanying drawings.

In accordance with one embodiment of this invention, a reel is provided having a line-storing spool pivotally mounted on a rod-attaching housing so that upon the casting stroke, the axis of the spool assumes a position which is substantially parallel with the rod and the line removed endwise therefrom, and upon retrieving of the line, the axis of the spool is perpendicular to the rod and the line wound on the spool by rotation thereof. For a more complete understanding of this invention, reference should now be had to the drawings wherein—

Figure 1:
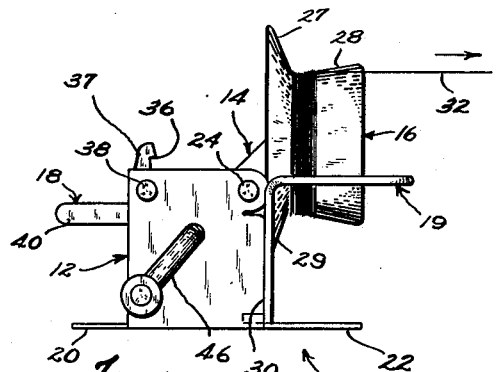
Fig. 1 is a side elevational view of the reel with the spool shown in position for casting the line.

Reference should now be had to the drawings wherein a reel 10 is shown comprising a housing 12, a bearing support member or arm 14 pivotally mounted on the upper portion of said housing, a spool 16 rotatably mounted on said support member, a trigger 18 pivotally mounted on said housing and adapted to engage with said support member when retrieving the line, and a line guard 19 mounted on said housing and extending forwardly therefrom and adapted to partially encompass the spool when in its casting position. The reel is constructed of some lightweight, sturdy, corrosive-resistant material, such as sheet metal.

Figure 2:
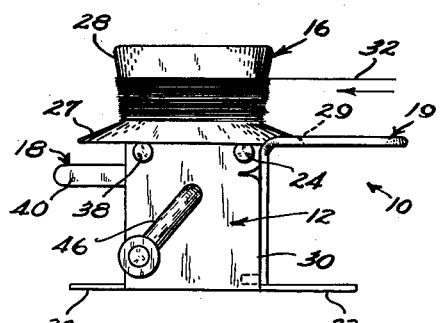
Fig. 2 is a side elevational view of the reel with the spool positioned for retrieving the line.

The housing, as shown in Figs. 1 and 2, is provided with laterally extending ears 20 and 22 at the lower portion thereof, which are secured to the rod (not shown) by any suitable means when in its operative position. The housing projects perpendicularly from the rod when secured thereto.

Figure 3:
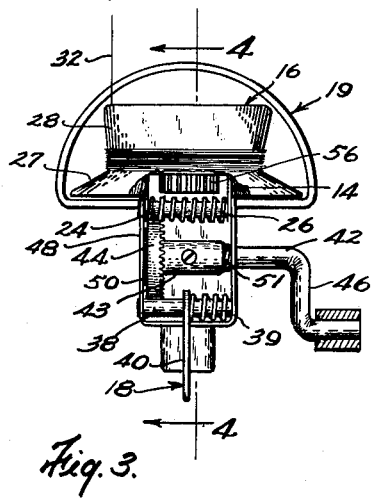
Fig. 3 is a top plan view of the reel with the spool positioned for casting the line and a portion of the spool removed to show the construction thereof.
Figure 4:
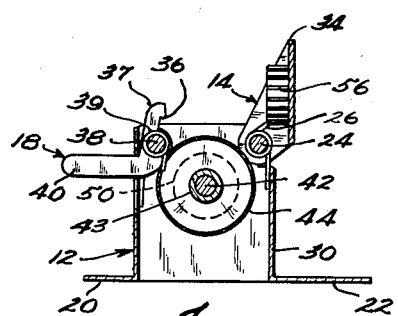
Fig. 4 is a fragmentary, sectional side elevational view of the reel taken along line 4—4 of Fig. 3 with the line guard and spool removed.

The bearing support member 14, as above mentioned, is pivotally mounted on housing 12 by means of a pin 24 extending therethrough, which is journaled at either end to said housing and is spring actuated by means of a coil spring 26 so as to cause the support member to be normally held in an extended or open position, as shown in Figs. 1, 3, and 4. The spring 26 automatically positions the spool in its correct relative position with respect to the rod for casting when the support arm 14 is released from the trigger 18. Thus, the casting technique is greatly simplified.

Rotatably mounted on support member 14 is spool 16, which is constructed of two shells 27 and 28, of substantially truncated cone shape, joined together at their narrow ends. When the support member 14 is extended, as shown in Figs. 1 and 3, the outside periphery 29 of the enlarged end of shell 27 contacts the forward side 30 of the housing and limits further pivoting and rotation of the spool. When the spool is in this position with its axis substantially parallel to the rod, the line 32, which is stored on said spool, is removed therefrom in an endwise direction by slipping over the enlarged end of shell 28. Thus, a cast is made in the manner common to reels of this type in which the line encounters only a negligible amount of friction when removed from the spool.

Figure 5:
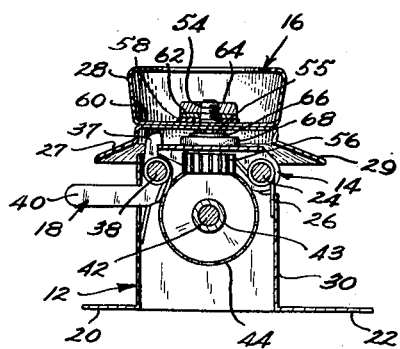
Fig. 5 is a sectional elevational view of the reel similar to Fig. 4, but with the spool positioned for retrieving the line.
Figure 6:
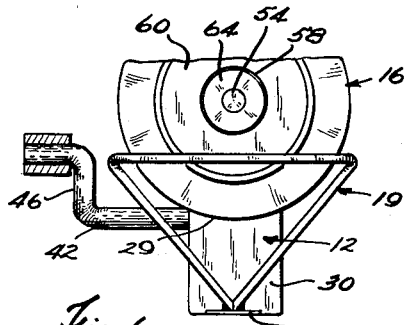
Fig. 6 is a fragmentary front elevational view of the reel with the spool positioned for casting.

In order to retrieve the line, the spool is pulled rearwardly in a cocking motion to the position shown in Figs. 2 and 5 so that free end 34 of the support member 14 engages in a notch 36 formed in one arm 37 of the spring-actuated L-shaped trigger 18. The trigger 18 is pivotally mounted to the upper portion of the housing 12 by means of a pin 38 which extends through said trigger and is journaled at either end to the housing. The trigger 18 is actuated by coil spring 39 so as to positively engage support member 14. The support member 14 may be released from the trigger 18 by a downward force being exerted on the rearwardly extending arm 40 of said trigger.

Rotatably mounted on housing 12 is a shaft 42 having a hub 43 and drive gear 44 mounted thereon at one end and enclosed within said housing. The other end of the shaft 42 terminates in a handle 46, as shown in Fig. 3. Intermediate the gear 44 and the adjacent side 48 of the housing 12 is positioned a friction washer 50. A coil spring 51 embracing shaft 42 and disposed within the hub 43 causes the gear 44 to positively engage the friction washer 50 and to prevent the line from rotating spool 16 through the gears during the casting stroke prior to the instant of releasing the same, thereby eliminating premature casting and accidental creeping of the line from the spool.

Rotatably mounted on the support member 14 is a spindle 54, threaded on one end and provided with annular shoulder 55 upon which is mounted spool 16. At the other end of the spindle is mounted a pinion gear 56, which meshes with drive gear 44 when the support member is engaged by trigger 18. The spool 16 is seated on the shoulder 55 of the spindle 54 and is driven by means of a rubber washer 58 which frictionally engages the base 60 of shell 28, a metallic washer 62 placed over the rubber washer, and an adjustable holding nut 64 which is threaded on said spindle, as shown in Fig. 5. Spindle 54 is rotatably mounted within a shouldered bushing 66 which is secured to the support arm 14 by means of locking nut 68 (see Fig. 5). Thus, means are provided for slippage of the gear-driven spool 16 in order that the line used may be retrieved safely without breakage.

The line guard 19, as above mentioned, is formed from wirelike material and is fastened to the forward side 30 of the housing 12 by welding or any other suitable means, and extends laterally and upwardly and then forwardly of the housing in a substantially semi-circular manner. The spool 16 when in its casting position, that is when its axis is parallel to the rod, is partially encompassed by the guard, so that when the line is removed endwise from the spool, the whip of the line is confined to within the guard and the line passes over the guard and is straightened out before passing over the rod, thus eliminating the whipping and dragging of the line during the casting.

The operation of the reel is substantially as follows: Upon casting, the trigger 18 is tripped downwardly, thereby releasing support arm 14 at the appropriate time when the bait commences its forward motion so as to cause the spool 16 to pivot and assume a position, as shown in Fig. 1, whereby the line 32 freely removes itself endwise therefrom. The distance of the cast is controlled at will by placing a finger lightly on the line 32 at the side of the spool 16. Upon completion of the cast, the spool 16 is pulled rearwardly to the position shown in Fig. 2 and the line 32 wound on the spool 16 by means of rotating the handle 46, which imparts a rotational movement to the spool.

Thus, it will be seen that a casting reel incorporating the advantages of endwise removal of the line from the spool has been provided which is simple yet sturdy in construction, effective in operation, and inexpensive to produce. Also, a spinning type reel has been provided which eliminates whipping of the line and thereby enables the line to pass freely over the rod upon the casting stroke.

While a particular embodiment of this invention has been shown, it will be understood, of course, that the invention is not to be limited thereto, since many modifications may be made and it is contemplated, therefore, by the appended claims to cover any such modifications as fall within the true spirit and scope of this invention.

I claim:

1. A device of the class described comprising a housing, a spring biased support member hingedly mounted on said housing and normally held in a casting position, a trigger mounted on said housing adapted to hold said member in a retrieving position, a spool for storing line mounted on said member and adapted to be rotated when said member is in said retrieving position and to remain in a substantially stationary position when said member is in said casting position, and means for rotating said spool, said rotating means comprising a shaft rotatably mounted on said housing, a gear mounted on said shaft and enclosed within said housing, a crank arm fixed to one end of said shaft, a spindle for the spool rotatably mounted on said support member, and a second gear mounted on said spindle and adapted to mesh with said first-mentioned gear when said support member is in the retrieving position.

2. A device of the class described comprising a rod-attaching housing, a spring biased support member hingedly mounted on said housing and normally biased to a casting position, a trigger mounted on said housing adapted to hold said member in a retrieving position, a spindle rotatably mounted in said support member, a spool for storing line secured to said spindle, a spool gear fixed to said spindle, spool rotating means mounted in said housing including a driving gear rotatably mounted in said housing and crank arm means for rotating said driving gear, said driving gear meshing with said spool gear only when said support member is in the retrieving position, and friction means engaging said rotating means to prevent unwinding of the spool when said support member is in the retrieving position and the spool is not rotated.

3. A device of the class described comprising a rod-attaching housing, a spring biased support member hingedly mounted on said housing and normally biased to a casting position, a trigger mounted on said housing adapted to hold said member in a retrieving position, a spindle rotatably mounted on said support member, a spool for storing line secured to said spindle, a spool gear fixed to said spindle, spool rotating means mounted in said housing including a driving gear rotatably mounted in said housing and crank arm means for rotating said driving gear, said driving gear meshing with said spool gear only when said support member is in the retrieving position, and a deflecting means mounted on said housing for restraining the rotary whipping action of such a line when cast.

4. A device of the class described comprising a rod-attaching housing, a spring biased support member hingedly mounted on said housing and normally biased to a casting position, a trigger mounted on said housing adapted to hold said member in a retrieving position, a spindle rotatably mounted in said support member, a spool for storing line secured to said spindle, a spool gear fixed to said spindle, and spool rotating means mounted in said housing including a driving gear rotatably mounted in said housing and crank arm means for rotating said driving gear, said driving gear meshing with said spool gear only when said support member is in the retrieving position.

CHARLES ISAAC DUNN.

References Cited in the file of this patent

UNITED STATES PATENTS

| Number | Name | Date |
| --- | --- | --- |
| 2,327,469 | Teitsma | Aug. 24, 1943 |
| 2,439,298 | Horan | Apr. 6, 1948 |
| 2,512,170 | Oen | June 20, 1950 |
| 2,549,029 | Stalder | Apr. 17, 1951 |
| 2,604,272 | Olsen | July 22, 1952 |

FOREIGN PATENTS

| Number | Country | Date |
| --- | --- | --- |
| 211,406 | Great Britain | Feb. 21, 1924 |
| 840,575 | France | Jan. 16, 1939 |
| 851,851 | France | Oct. 9, 1939 |